Figure 1:
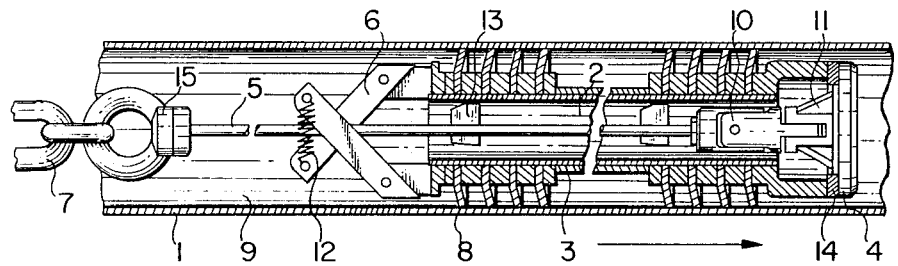

s
United States Patent [19]

Streng et al.

[11] 3,814,564

[45] June 4, 1974

[54] SAFETY SUPPORTED PISTON FOR EXTRUDED TUBULAR ELEMENTS

[75] Inventors: Erwin Streng, Straubing; Arnold Schurian, Bogen, both of Germany

[73] Assignee: Kunststoffwerk Gebruder Anger GmbH & Co., Munich, Germany

[22] Filed: Oct. 19, 1972

[21] Appl. No.: 298,807

[52] U.S. Cl. ............... 425/383, 264/95, 269/47, 425/153, 425/326 R, 425/387 R
[51] Int. Cl. ............................................. B29d 23/04
[58] Field of Search ............ 269/23, 47; 264/95, 99, 264/207; 425/151, 153, 154, 110, 325, 381, 393, 455, 467, 468, 383, 326 R, 392, 387 R

[56] References Cited
UNITED STATES PATENTS

| | | | |
|---|---|---|---|
| 2,708,772 | 5/1955 | Moncrieff | 264/209 |
| 3,296,661 | 1/1967 | De Moustier | 264/95 X |
| 3,426,113 | 2/1969 | Yazawa | 264/95 |
| 3,720,557 | 3/1973 | Longoni et al. | 264/95 X |

*Primary Examiner*—Roy Lake
*Assistant Examiner*—Neil Abrams
*Attorney, Agent, or Firm*—Edmund M. Jaskiewicz

[57] ABSTRACT

A safety supporting piston for extruded hollow members comprises a hollow plug portion whose forward end is closed by a valve. A traction rod is connected to the valve and passes through the interior of the plug portion to be connected by a chain to the mandrel of the extruder. The valve has a smaller mass and larger projected area than the plug portion so as to become separated therefrom upon breakage of the chain.

8 Claims, 2 Drawing Figures

SAFETY SUPPORTED PISTON FOR EXTRUDED TUBULAR ELEMENTS

The present invention relates to supporting pistons for extruded tubular elements, more particular, to a safety device on such supporting pistons.

Supporting pistons also known as trailing mandrels or cores have been employed in the extrusion of various forms of hollow members such as tubular elements, particularly those made of synthetic plastic materials. The supporting piston is positioned in the interior of the extruded tubular element and is generally attached to the mandrel of the extruder by a traction chain. The function of the supporting piston is to maintain a certain supporting pressure in the interior of the extruded tube to prevent collapse of the extruded material while it is still soft and to press the tubular member while still in the plastic state against the cooling wall of a calibrating die. The supporting pressure is produced by introducing compressed air through the extruder head into the extruded tube.

Upon operating conditions, the chain connecting the supporting piston to the mandrel has been known to break. The supporting piston was then propelled from the tube under the force of the compressed air within the tube. The propelled supporting piston, which under these circumstances is like a projectile, can cause serious injury to operating personnel and considerable damage to equipment.

It is therefore the principal object of the present invention to provide a novel and improved safety device for such supporting pistons which prevents propelling of the supporting piston from the tube should the traction chain break.

It is another object of the present invention to provide such a supporting piston which will move only a very short distance within the extruded tube in the event the traction chain should break.

It is a further object of the present invention to provide a supporting piston which permits the immediate escape of compressed air within the tube and results in the supporting piston remaining in the tube should the traction chain break.

The objects of the present invention are achieved and the disadvantages of the prior art as described aboe are eliminated by the safety device for a supporting piston as disclosed herein. According to one aspect of the present invention a supporting piston for an extruded tubular element, particularly of synthetic plastic material may comprise a hollow plug portion and a valve closing the forward end of the plug portion. The valve has a smaller mass and larger projected surface area than the plug portion whereby the valve will have a greater acceleration than the plug portion under the influence of supporting pressure within the supporting piston. As a result, the valve will become separated from the plug portion should the supporting piston become detached within the tubular element. Thus, should the traction chain break, the supporting pressure within the supporting piston will force the valve to accelerate at a greater rate than the plug portion and the resulting separation of the valve from the plug portion will enable the supporting pressure to escape from the supporting piston into the atmosphere. At the same time, expandable jaw means are provided on the plug portion to engage the inner surface of the wall of the extruded tube upon breaking of the traction chain.

Figure 2:
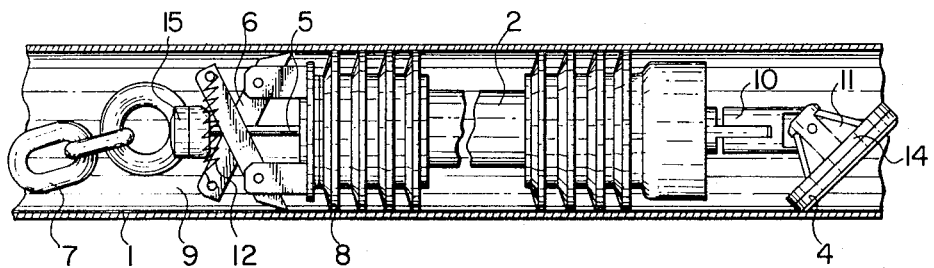

Other objects and advantages of the present invention will be apparent from the accompanying description when taken in conjunction with the following drawings, which are exemplary, wherein:

FIG. 1 is a side elevational view of the supporting piston according to the present invention in its normal postion within an extruded tubular element shown in section; and FIG. 2 is a view similar to that of FIG. 1 but showing the supporting piston in its operating position attained upon breaking of the traction chain.

Proceeding next to the drawings wherein like reference symbols indicate the same parts throughout the various views a specific embodiment of the present invention will be described in detail.

An extruded tube 1 of a suitable plastic material as known in the extrusion art emerges from the extruder orifice, which is not shown in the drawings, and moves in the direction of the arrow. A supporting piston 2 is positioned within the tube 1 and comprises a plug portion 3 which is hollow or tubular and a valve 4 which closes the open forward end of the plug portion. A pair of jaws 6 are pivotally mounted at the rearward end of the plug portion and are maintained in their normally closed position as shown in FIG. 1 by a spring 12. The ends of the jaw members are pointed or sharpened so as to form a sharp edge which can become embedded in the inner surface of the wall of the tube 1.

A valve traction rod 5 extends through the plug portion 3 and is connected to the inner surface of the valve member 4 by means of a universal joint 10 and centering cone 11. The rod 5 is provided with an impact head 15 which is engageable with the outer ends of the jaws 6. A traction chain 7 connects the valve traction rod 5 to the mandrel of the extruder which is not illustrated. The chain 7 is provided with a predetermined breaking point near the ring nut by which it is attached to the rod 5. Thus, when a force exceeding a predetermined maximum is exerted upon the supporting piston the chain 7 will break.

The supporting piston 2 is provided with a plurality of spaced rubber disks 8 which closely engage the inner surface of the wall of the tube 1 to seal off a space 9 within which a supporting pressure is achieved by introducing compressed air therein through the extruder.

A plurality of guide elements 13 are provided on the rod 5 so as to position the rod 5 within the supporting piston. A sealing ring 14 is provided on the valve seat at the forward end of the plug portion upon which the valve member 4 is positioned.

The valve member 4 has considerably less mass than the plug portion 3 so that the valve member 4 will accelerate at a greater rate should a force be exerted on these two components. Further, the valve member 4 has a greater projected surface area on its inner face than does the plug portion. Thus, the compressed air within the tube can exert a greater force on the valve member than upon the plug portion 3.

In the operation of the supporting piston according to the present invention should the traction chain 7 break, the full force of the compressed air within the tube will act upon the valve member. The valve member will thus be accelerated forwardly of the plug portion, to the right as viewed in the drawings, to become separated from the plug portion. After separation of the valve member 4 from the plug portion the impact head 15 on the rod 5 will strike the jaws 6 and spread the jaws outwardly so that their edges become embedded in the wall of the tube 1 as shown in FIG. 2. The embedding of the jaws in the tube element will stop the movement of both the plug portion and the valve element. The valve element separates sufficiently from the plug portion to enable the compressed air in space 9 to escape through the opened valve to the atmosphere. The distance that the supporting piston travels within the tubular element 1 is thus limited to a minimum after the traction chain breaks.

Based upon actual tests, a supporting piston constucted in accordance with the present invention and employed in the extrusion of a tube of synthetic resin having a nominal diameter of 200 mm. was displaced a maximum of 100 mm. within the tube after the chain broke. Without the safety device according to the present invention the piston would be hurled far out of the extruded tube in the manner of a projectile.

Thus it can be seen that the present invention provides a safety device for a supporting piston wherein the compressed air forming the supporting pressure within the extruded tube can escape immediately to the atmosphere upon breakage of the traction chain. At the same time, means are provided on the supporting piston within the extruded tube upon breakage of the traction chain. Thus, the present invention eliminates the possibility of the supporting piston becoming a projectile hurled from the extruded tube should the traction chain break.

It will be understood that this invention is susceptible to modification in order to adapt it to different usages and conditions, and accordingly, it is desired to comprehend such modifications within this invention as may fall within the scope of the appended claims.

What is claimed is:

1. A supporting piston for an extruded tubular element of synthetic plastic material, connector means adapted to connect said piston to an extruder with the piston situated inside of said tubular element, said piston comprising a hollow plug portion and a valve closing the forward end of said plug portion, said valve having a smaller mass and larger projected surface area than said plug portion whereby the valve will have a greater acceleration than said plug portion under the influence of supporting pressure within the supporting piston to become separated from the plug portion should the supporting piston become detached within the tubular element, and means normally out of engagement with the inner wall of the tubular element and actuated upon opening of said valve to engage and bind against the inner wall of the tubular element.

2. A supporting piston as claimed in claim 1 wherein there is a valve seat on the forward end of said plug portion and said valve is disposed on said valve seat.

3. A supporting piston as claimed in claim 1 and wherein said wall engaging means comprises pivotally mounted jaw means at the rearward end of said plug portion and engageable with the wall of the tubular element when in the open position, and spring means maintaining said jaw means in the closed position.

4. A supporting piston as claimed in claim 2 wherein said valve portion comprises a valve member positionable on said valve seat, a centering cone on the inner surface of said valve member, a universal joint having one end thereof connected to said centering cone, and a valve traction rod within said plug portion and connected to the other end of said centering cone.

5. A supporting piston as claimed in claim 4 and comprising an impact head on said traction rod and engageable with said jaw means.

6. A supporting piston as claimed in claim 4 and comprising guide means on said traction rod for positioning said traction rod within said plug portion.

7. A supporting piston as claimed in claim 1 and wherein said connector means comprises a chain connected to said valve and adapted for connecting to the mandrel of the extruder.

8. A supporting piston as claimed in claim 7 wherein said chain has a predetermined breaking point.

* * * * *